United States Patent
Harrell

[19]

[11] Patent Number: 5,863,063
[45] Date of Patent: Jan. 26, 1999

[54] VEHICLE SEAT SIDE AIRBAG GUIDE CHUTE

[75] Inventor: David Harrell, Troy, Mich.

[73] Assignee: Lear Corporation, Southfield, Mich.

[21] Appl. No.: 935,390

[22] Filed: Sep. 23, 1997

[51] Int. Cl.⁶ .................................................. B60R 21/22
[52] U.S. Cl. ..................................... 280/730.2; 280/728.3
[58] Field of Search ........................... 280/730.1, 730.2, 280/728.2, 728.3

[56] References Cited

U.S. PATENT DOCUMENTS

| | | |
|---|---|---|
| 3,623,768 | 11/1971 | Capener . |
| 4,946,191 | 8/1990 | Putsch . |
| 5,265,903 | 11/1993 | Kuretake et al. . |
| 5,277,441 | 1/1994 | Sinnhuber . |
| 5,348,342 | 9/1994 | Haland et al. . |
| 5,393,090 | 2/1995 | Shepherd et al. . |
| 5,496,061 | 3/1996 | Brown . |
| 5,498,030 | 3/1996 | Hill et al. . |
| 5,499,840 | 3/1996 | Nakano . |
| 5,505,486 | 4/1996 | Ahn . |
| 5,531,470 | 7/1996 | Townsend . |
| 5,536,038 | 7/1996 | Bollaert et al. . |
| 5,542,691 | 8/1996 | Marjanski et al. . |
| 5,542,696 | 8/1996 | Steffens, Jr. et al. . |
| 5,547,214 | 8/1996 | Zimmerman, II et al. . |
| 5,564,735 | 10/1996 | Boy et al. . |
| 5,564,736 | 10/1996 | Kim . |
| 5,566,977 | 10/1996 | Wipasuramonton . |
| 5,588,671 | 12/1996 | Boumarafi et al. . |
| 5,601,332 | 2/1997 | Schultz et al. . |
| 5,603,523 | 2/1997 | Rhule et al. . |
| 5,613,704 | 3/1997 | White, Jr. et al. . |
| 5,628,527 | 5/1997 | Olson et al. . |
| 5,630,615 | 5/1997 | Miesik . |
| 5,630,616 | 5/1997 | McPherson . |
| 5,634,657 | 6/1997 | Rose et al. . |
| 5,636,862 | 6/1997 | Cheung et al. . |
| 5,639,111 | 6/1997 | Spencer et al. . |
| 5,678,853 | 10/1997 | Maly ..................................... 280/730.2 |
| 5,749,597 | 5/1998 | Saderholm ........................... 280/730.2 |
| 5,762,363 | 6/1998 | Brown et al. ........................ 280/730.2 |

*Primary Examiner*—Paul N. Dickson
*Attorney, Agent, or Firm*—Brooks & Kushman P.C.

[57] ABSTRACT

A vehicle seat assembly includes a seat backframe and a foam cushion positioned adjacent the backframe. A trim cover is secured over the foam cushion and includes first and second edge portions sewn together along a seam. A side airbag module is secured to the backframe for airbag deployment through the seam. An airbag guide chute is secured to the side airbag module and includes first and second end portions secured to the first and second edge portions, respectively, of the trim cover. The chute is sufficiently flexible and strong to guide the deploying airbag through the seam, thereby preventing fragmentation of the foam and destruction of the trim cover material.

18 Claims, 1 Drawing Sheet

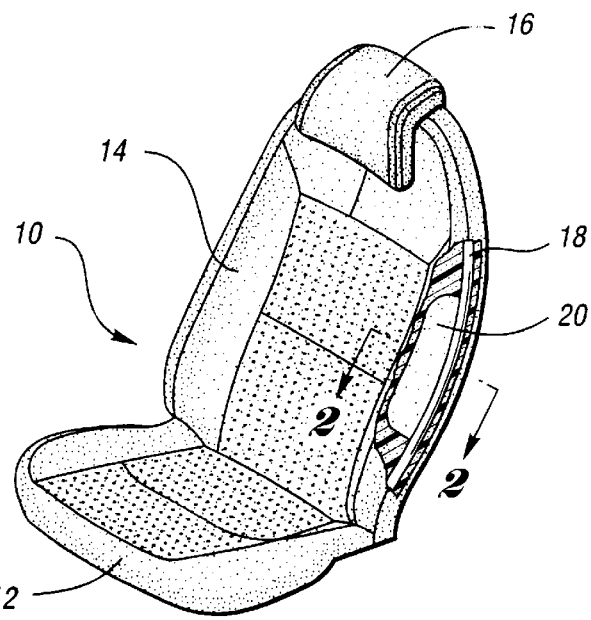
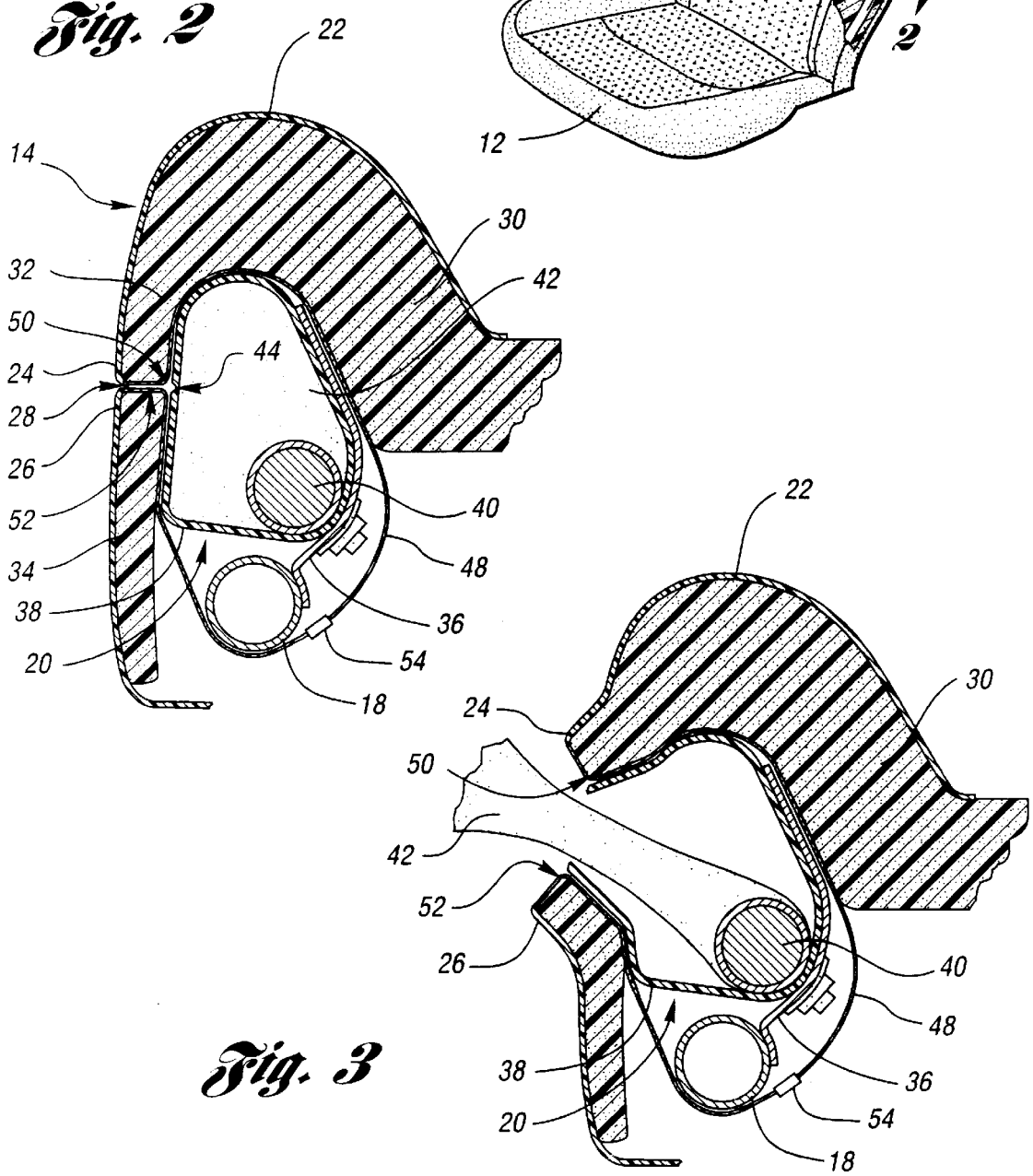

VEHICLE SEAT SIDE AIRBAG GUIDE CHUTE

TECHNICAL FIELD

The present invention relates to a vehicle seat side airbag guide chute, and more particularly to a flexible, strong guide chute extending around a side airbag module and having opposing ends secured within a trim cover seam for guiding the deploying airbag through the seam.

BACKGROUND OF THE INVENTION

Typically, vehicle side airbag assemblies are mounted inside the seat assembly on a seat backframe component, or mounted on the outside of the seat trim cover.

Side airbag modules mounted to a seat backframe within the trim cover and foam cushion may be problematic because the deploying airbag may cause destruction of the foam and trim cover material. Also, the strength of the trim cover material and inconsistencies in manufacturing may result in variances in the airbag deployment path.

Side airbag modules mounted outside of the seat trim cover are undesirable for aesthetic reasons, and also because they take up passenger compartment space.

Accordingly, it is desirable to provide a side airbag system which includes an airbag module disposed within the seat assembly, such that the airbag is deployable in a manner in which the deployment path is predictable and repeatable, and the foam cushion and trim cover material are not fragmented and destroyed.

DISCLOSURE OF THE INVENTION

The present invention overcomes the above-referenced shortcomings of vehicle seat side airbag systems by providing a vehicle seat assembly with an airbag module secured inside the seat assembly and including a flexible and strong airbag guide chute which extends around the side airbag module. The guide chute is secured to the trim cover along a trim cover seam for guiding airbag deployment through the seam in a manner to prevent foam and trim cover material fragmentation.

More specifically, the present invention provides a vehicle seat assembly including a seat backframe with a foam cushion positioned adjacent the seat backframe. A trim cover is secured over the foam cushion and includes first and second edge portions sewn together along a seam. A side airbag module is secured to the backframe for airbag deployment through the seam. An airbag guide chute extends around the side airbag module and includes first and second end portions secured to the first and second edge portions, respectively, of the trim cover. The chute is sufficiently flexible and strong to guide the deploying airbag through the seam, thereby preventing fragmentation of the foam and destruction of the trim cover material.

Preferably, the guide chute comprises a nylon material, such as that used for the airbag. Also, the guide chute preferably extends around a portion of the seat backframe for support, and includes a zippered rear portion for facilitating attachment around the backframe.

Accordingly, with the present invention, after deployment, only the airbag module need be replaced, and the trim cover material and foam cushion may simply be resewn at the seam, as opposed to replacing the entire seat.

Therefore, an object of the present invention is to provide a vehicle seat side airbag assembly, deployment of which does not cause fragmentation of the foam cushion material nor destruction of the seat trim cover material.

Another object of the present invention is to provide a vehicle seat side airbag module including a guide chute sewn into a trim cover seam for guiding deployment of the airbag through the seam in a manner to prevent foam cushion fragmentation and trim cover destruction.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 shows a schematically arranged, cut-away side view of a vehicle seat incorporating a side airbag assembly in accordance with the present invention;

FIG. 2 shows a cross-sectional view taken at line 2—2 of FIG. 1; and

FIG. 3 shows the cross-sectional view of FIG. 2 after airbag deployment.

DETAILED DESCRIPTION OF THE PREFERRED EMBODIMENT

FIG. 1 shows a schematic perspective view of a vehicle seat assembly 10 in accordance with the present invention. The vehicle seat assembly 10 includes a lower seat 12 with a seat back 14 connected thereto, and having a headrest 16 on top of the seat back 14.

The seat back 14 includes a seat backframe 18 for supporting a cushion and trim cover, as described below. The backframe 18 also supports a side airbag assembly 20 for deployment through the side of the seat in a side impact.

FIGS. 2 and 3 show sectional views taken along line 2—2 of FIG. 1 to illustrate the details of the side airbag module assembly 20 in accordance with the present invention.

As shown in FIG. 2, the seat back 14 includes a trim cover material 22 with first and second edge portions 24,26 sewn together along a seam 28. A foam cushion 30 is disposed within the trim cover 22 and includes first and second portions 32,34 separated by the seam 28. The side airbag assembly 20 is secured to the backframe 18 by means of the bracket 36 directly adjacent the seam 28 for airbag deployment through the seam.

The side airbag assembly 20 includes a side airbag housing 38 which encloses an inflator 40 for inflating the airbag 42.

The airbag housing 38 includes a small opening 44 for airbag deployment.

The present invention is characterized by the airbag deployment chute 48 which extends around the side airbag assembly 20 and further around the backframe portion 18. Of course, the chute 48 need not surround both the airbag module and frame 18, but requires certain structural support for deployment.

The chute 48 includes first and second end portions 50,52 sewn directly to the first and second edge portions 24,26, respectively, of the trim cover 22. This could be a commonly known French seam, join seam, or other appropriate seam for attachment of the chute to the trim cover edge portions 24,26.

The chute 48 is preferably a nylon material such as that used for the airbag, which is a 630 Denier, or any other such high strength material which preferably is stronger than the trim cover material and stronger than the thread material used at the seam 28 between the trim cover edge portions 24,26. The chute 48 is sufficiently flexible and of sufficiently high strength to guide the deploying airbag 42 through the seam 28 when the inflator 40 inflates the airbag 42. The use of nylon material for the chute 48 is particularly advantageous because it is high strength and very lightweight, and weight reduction is a common theme in vehicle design.

The nylon chute 48 also includes a zipper 54 along a rear portion of the nylon chute 48 to facilitate assembly of the chute 48 over the installed side airbag module 20.

In this configuration, the nylon chute 48 is operative to guide deployment of the airbag 42 through the seam 28, thereby preventing fragmentation of the foam 30 and destruction of the trim cover 22.

FIG. 3 shows the vehicle seat assembly 10 of FIG. 2 after the airbag 42 has been deployed. As shown, the airbag 42 deploys through the small opening 44 in the side airbag housing 38 in a manner to force the side airbag housing 38 open for deployment. During deployment, the attachment of the end portions 50,52 of the chute 48 to the first and second edge portions 24,26, respectively, of the trim cover 22 remains intact to guide deployment of the airbag through the seam 28, thereby only breaking the threads at the seam 28 and not fragmenting the foam material 30, nor destroying the trim cover material 22. Because the threads at the seam 28 are not as strong at the guide chute 48 or trim cover material 22, the deploying airbag 42 bursts the threads at the seam 28 for such deployment.

With the present invention, after the airbag 42 has been deployed through the seam 28, the entire seat assembly need not be replaced. Only the airbag module 20 must be replaced, and the seam 28 must be resewn, as there should be no fragmentation of foam nor trim cover destruction, however some limited damage may occur in some instances.

While the best mode for carrying out the invention has been described in detail, those familiar with the art to which this invention relates will recognize various alternative designs and embodiments for practicing the invention within the scope of the appended claims.

What is claimed is:

1. A vehicle seat assembly, comprising:
    a seat backframe;
    a foam cushion positioned adjacent the backframe;
    a trim cover secured over the foam cushion and including first and second edge portions sewn together along a seam;
    a side airbag module secured to the backframe for airbag deployment through the seam; and
    an airbag guide chute secured to the side airbag module and having first and second end portions secured to the first and second edge portions, respectively, of the trim cover, wherein the chute comprises a sufficiently flexible and strong material to guide the deploying airbag through the seam, thereby preventing fragmentation of the foam and destruction of the trim cover.

2. The vehicle seat assembly of claim 1, wherein the airbag guide chute comprises a nylon material.

3. The vehicle seat assembly of claim 1, wherein the guide chute extends around a portion of the seat backframe.

4. The vehicle seat assembly of claim 3, wherein the guide chute further includes a zippered rear portion for attachment around the backframe portion.

5. The vehicle seat assembly of claim 1, wherein said foam cushion comprises first and second foam portions separated by the seam.

6. The vehicle seat assembly of claim 1, wherein the first and second end portions of the guide chute are sewn to the first and second edge portions, respectively.

7. The vehicle seat assembly of claim 1, further comprising a support bracket securing the side airbag module to the seat backframe.

8. A vehicle seat assembly, comprising:
    a seat backframe;
    a foam cushion positioned adjacent the backframe;
    a trim cover secured over the foam cushion and including first and second edge portions sewn together along a seam;
    a side airbag module secured to the backframe for airbag deployment through the seam; and
    an airbag guide chute extending around the side airbag module and having first and second end portions secured to the first and second edge portions, respectively, of the trim cover, wherein the chute comprises a nylon material sufficiently strong to guide the deploying airbag through the seam, thereby preventing fragmentation of the foam and destruction of the trim cover.

9. The vehicle seat assembly of claim 8, wherein the guide chute extends around a portion of the seat backframe.

10. The vehicle seat assembly of claim 9, wherein the guide chute further includes a zippered rear portion for attachment around the backframe portion.

11. The vehicle seat assembly of claim 8, wherein said foam cushion comprises first and second foam portions separated by the seam.

12. The vehicle seat assembly of claim 8, wherein the first and second end portions of the guide chute are sewn to the first and second edge portions, respectively.

13. The vehicle seat assembly of claim 8, further comprising a support bracket securing the side airbag module to the seat backframe.

14. A vehicle seat assembly, comprising:
    a seat backframe;
    a foam cushion positioned adjacent the backframe;
    a trim cover secured over the foam cushion and including first and second edge portions of the trim cover sewn together along a seam;
    a side airbag module secured to the backframe for airbag deployment through the seam; and
    an airbag guide chute extending around the side airbag module and around a portion of the seat backframe, and having first and second end portions secured to the first and second edge portions, respectively, of the trim cover, wherein the chute comprises a nylon material of sufficient strength to guide the deploying airbag through the seam, thereby preventing fragmentation of the foam and destruction of the trim cover.

15. The vehicle seat assembly of claim 14, wherein the guide chute further includes a zippered rear portion for attachment around the backframe portion.

16. The vehicle seat assembly of claim 14, wherein said foam cushion comprises first and second foam portions separated by the seam.

17. The vehicle seat assembly of claim 14, wherein the first and second end portions of the guide chute are sewn to the first and second edge portions, respectively.

18. The vehicle seat assembly of claim 14, further comprising a support bracket securing the side airbag module to the seat backframe.

* * * * *